US010504230B1

(12) United States Patent
Stahl et al.

(10) Patent No.: US 10,504,230 B1
(45) Date of Patent: Dec. 10, 2019

(54) MACHINE VISION CALIBRATION SYSTEM WITH MARKER

(71) Applicant: AMAZON TECHNOLOGIES, INC., Seattle, WA (US)

(72) Inventors: Joachim Sebastian Stahl, Sammamish, WA (US); Ammar Chinoy, Seattle, WA (US); Jason Michael Famularo, Seattle, WA (US); Pranab Mohanty, Redmond, WA (US); Gianna Lise Puerini, Bellevue, WA (US); Jared Joseph Frank, Snoqualmie, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/577,385

(22) Filed: Dec. 19, 2014

(51) Int. Cl.
| G06K 7/10 | (2006.01) |
| G06T 7/00 | (2017.01) |
| G06Q 10/08 | (2012.01) |
| G06K 19/06 | (2006.01) |

(52) U.S. Cl.
CPC ........ *G06T 7/0018* (2013.01); *G06K 19/0614* (2013.01); *G06K 19/06037* (2013.01); *G06Q 10/087* (2013.01); *G06T 2207/10004* (2013.01); *G06T 2207/30204* (2013.01)

(58) Field of Classification Search
CPC ......... G06K 19/06037; G06K 19/0614; G06K 2019/06225; G06K 1/123; G06K 7/10712; G06K 7/12; G06K 19/06056; G06K 19/06009; G06K 19/06018; G06K 7/10722; G06K 7/10821; G06K 7/14; G06K 7/1443

USPC ............... 235/462.01, 462.03, 494
See application file for complete search history.

(56) References Cited

U.S. PATENT DOCUMENTS

| 6,418,244 B2* | 7/2002 | Zhou ................. G06K 7/14 382/232 |
| 7,032,823 B2 | 4/2006 | Nojiri |
| 7,225,980 B2 | 6/2007 | Ku et al. |
| 7,278,585 B2* | 10/2007 | Boitsov ............ G06K 19/06037 235/456 |
| 7,478,746 B2* | 1/2009 | Cattrone ......... G06K 19/06009 235/10 |
| 7,949,568 B2 | 5/2011 | Fano et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Seung H Lee
(74) *Attorney, Agent, or Firm* — Lindauer Law, PLLC

(57) ABSTRACT

Described are systems and techniques for using machine-readable optical markers to calibrate a machine vision system. In one implementation, the machine vision system may generate calibration data associating spatial coordinates with image coordinates of the machine-readable marker in an image acquired by a camera. The machine-readable marker may comprise a blend of an optical code that encodes marker data and a human-readable source graphic image. In some implementations, the optical code of the markers may be detectable under infrared light while remaining invisible to the unaided eye.

21 Claims, 9 Drawing Sheets

(56) References Cited

U.S. PATENT DOCUMENTS

| | | |
|---|---|---|
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 2011/0011936 A1 | 1/2011 | Morandi et al. |
| 2011/0205569 A1 | 8/2011 | Eschbach et al. |
| 2012/0284132 A1 | 11/2012 | Kim et al. |
| 2013/0112751 A1* | 5/2013 | Maurer ............ G06K 19/06046 235/454 |
| 2013/0284806 A1 | 10/2013 | Margalit |
| 2014/0128095 A1* | 5/2014 | Finlow-Bates ....... H04W 4/021 455/456.1 |
| 2015/0086107 A1 | 3/2015 | Dedeoglu et al. |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lalambent_devices_to_deliver_salient_information_in_supermarkets>.

Pop, Cristian, "Introduction to the BodyCom Technology", AN1391, DS01391A, Microchip Technology, Inc., May 2, 2011.

* cited by examiner

MACHINE VISION CALIBRATION SYSTEM WITH MARKER

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the location or movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
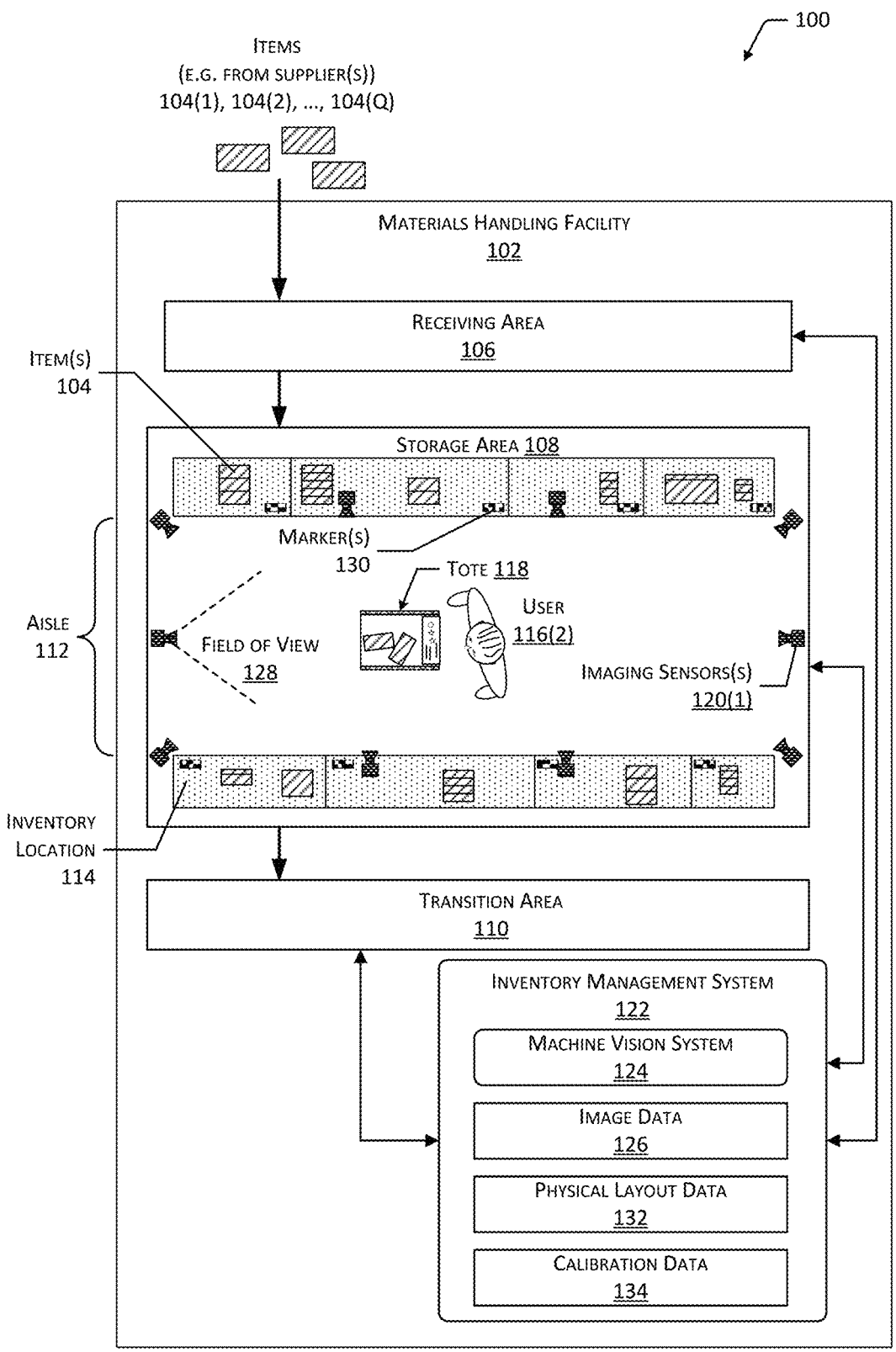
FIG. 1 is a block diagram illustrating a materials handling facility (facility) configured to use markers for calibration of a machine vision system.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for calibrating a machine vision system using a marker. Imaging sensors, such as cameras, may be arranged within a materials handling facility (facility) to generate image data. The facility may include, or have access to, an inventory management system. The inventory management system may be configured to maintain information about items, users, condition of the facility, and so forth, using the image data. For example, the inventory management system may maintain information indicative of location of a user in the facility, a quantity of items at particular inventory locations, what items a particular user is handling, environmental status of the facility, and so forth.

A machine vision system may process the image data to identify objects, track objects, and so forth, at a facility or other setting. To facilitate operation of the facility, the machine vision system may calibrate the cameras. The calibration may involve determining which part (spatial location) of the facility is in the image, determining a relative position and orientation between the camera and an object in the image, and so forth.

The facility may contain a number of cameras at numerous locations, having different fields of view, pointed in different directions, and so forth. Traditional systems to calibrate the machine vision system have involved manual intervention that is time intensive and costly. Cameras may be added or removed, replaced for maintenance, and so forth, resulting in the potential for ongoing changes in the facility for which calibration may be called for to improve performance of the machine vision system.

Described in this disclosure are systems and devices for calibrating a machine vision system using one or more markers arranged within in a facility. The marker comprises an optical code, such as a two-dimensional matrix code having a grid of contrasting colored squares with the position and color being used to represent data. For example, in a hue-saturation-value (HSV) colorspace, where value is between 0 and 100, colors having a difference of at least 50 in value may be used. In another example, the colors may include black and white, blue and orange, red and green, purple and yellow, and so forth. The marker may encode marker data that may be used to associate the particular marker with a particular location within the facility, object such as a tote, and so forth. The marker may also be indicative of an orientation, such as containing one or more asymmetrical features that allow for a determination of the orientation of the marker.

The markers may be rectangular, such that their width is greater than their height. In this configuration, the markers may be placed in various locations, such as near or on a front edge of a shelf. Additionally, the rectangular shape allows placement of the marker in narrower strips but with a relatively large area. By enlarging the area of the marker, relative to square optical encoding schemes, the distance at which a camera may acquire an image having sufficient detail of the marker so as to read it may be increased. For example, a shelf edge may be about 3 centimeters (cm) tall but 100 cm wide. Traditional square matrix codes such as a QR Code would be limited to an area of 9 cm$^2$. Depending upon the resolution of the camera and the optics, the square matrix code may only be readable to a distance of less than 2 meters (m). In comparison, using a wide aspect ratio marker as described herein with the same camera and optics, the marker data may be read and decoded at distances exceeding 2 m.

In some situations, users may find the optical codes distracting or obtrusive. The markers may be placed at locations in the facility that are unobtrusive. For example, where the camera is mounted above the user's head and looking down on an inventory location such as a shelf, the marker may be located on an upper surface of a top shelf that is visible to the camera but not readily seen by a user. In another example, the marker may be located on an outer edge of a shelf.

The markers may be constructed such that the optical code is detectable by a camera but is invisible or less visible to the unaided eye of the user. For example, the markers may be constructed using materials that are reflective or absorptive of infrared (IR), allowing an IR camera to detect the optical code that is not visible to the user. In another example, the marker constructed to be detectable in IR may be located behind one or more layers of optically opaque but IR-transmissive material. Continuing the example, the unaided eye may see a white surface while visible light is reflected, but an IR camera may detect the IR marker beneath.

The markers may include other visual markings as well as the optical code. A source image may be blended or combined with an image of the optical code to produce a blended image. For example, the source image may be of a logo, which may be combined to produce a logo that incorporates the optical code. The colors used to encode data may be adapted to correspond with the logo. For example, where the logo includes orange, the data may be encoded using black and white, with the orange logo appearing to overlay the optical code. Where the portion of the source image overlaps a light square, a lighter shade of the color, such as light orange, may be presented. Similarly, where the portion of the source image overlaps a dark square, a darker shade, such as dark orange, may be presented. As a result, the information in the source image may be presented to users while maintaining the readability of the marker data for use by the machine vision system.

In some implementations, several of these techniques may be combined to reduce visibility or perceived obtrusiveness of the markers. For example, an IR-detectable marker that is not visible to the unaided eye may be placed on the upper surface of the top shelf at an inventory location.

Instead of, or in addition to, providing a marker for calibration, the markers may be used to identify objects. For example, a tote may display a marker, a nametag of a user in the facility may include a marker, and so forth.

Sensors may be located at different points within the facility, according to the type of sensor. For example, a camera may be located overhead to track movement or identify objects such as items, users, totes, and so forth. In comparison, a weight sensor may be located at an inventory location to weigh items stowed in the inventory location.

Based on the data acquired from the sensors, information indicative of a pick of items from the inventory location, placement of items to the inventory location, changes in item quantities at the inventory location, and so forth, may be generated. The inventory management system may use data obtained from the machine vision system to maintain information about inventory levels, track movement of items in the facility, and so forth.

By using the techniques described in this disclosure, a machine vision system may be automatically calibrated, markers used to identify objects may be read from greater distances, and so forth. For example, as cameras are added or removed from the facility, they may be automatically calibrated such that their relative position and orientation with respect to a marker may be determined. Once calibrated, the machine vision system may provide accurate information such as object identification or object tracking to the inventory management system. The inventory management system may use this data to operate the facility, such as tracking items, users, vehicles, and so forth. As a result, overall operation of the facility and the user experience may be improved.

Illustrative System

An implementation of a materials handling system 100 configured to store and manage inventory items is illustrated in FIG. 1. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth. The totes 118 are discussed in more detail below with regard to FIG. 4.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, cameras, 3D sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain imaging sensors (cameras) 120(1) configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the items 104 arrive at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116, operator of the facility 102, or others may benefit from information or actions which are based on data obtained from the one or more imaging sensors 120(1). For example, a pick list may be presented to the user 116 for items 104 that are in inventory locations 114 near a current location of the user 116 in the facility 102.

The inventory management system 122 may include a machine vision system 124. The machine vision system 124 is configured to process image data 126 generated by the imaging sensors 120(1). The imaging sensor 120(1) exhibits a field of view 128 which includes a portion of a scene in the facility 102. Arranged within the field of view 128 of the imaging sensor 120(1) may be one or more markers 130. For example, one or more markers 130 may be arranged along a shelf outer edge of an inventory location 114.

The markers 130 provide a reference point for calibration of the image data 126. The markers 130 present an optical code that is representative of marker data. The marker data may include information indicative of a spatial location in the facility 102, an identification number, and so forth. For example, the marker data may comprise spatial coordinates, a serial number, and so forth.

The machine vision system 124 may access physical layout data 132 to generate calibration data 134. The physical layout data 132 may be indicative of a particular location in the facility 102 of a particular marker 130. For example, the marker 130(1) may encode marker data "0123". The physical layout data 132 may store information that marker data "0123" is located at spatial coordinates (131, 67, 1) corresponding to a right edge of inventory location 114(7) in aisle 112(1). Given the physical layout data 132, the image data 126 that includes an image of the marker 130(1) may be determined to be inclusive of the spatial coordinates associated with the marker 130(1). The calibration data 134 may be used to associate particular image data 126 with a particular location in the facility 102, particular image coordinates in the image data 126 with a particular set of spatial coordinates, and so forth.

In some implementations, the machine vision system 124 may use the marker 130 to generate calibration data 134 without use of the physical layout data 132. For example, the marker 130 may be assumed to be flat. Based on the features of the marker 130, such as the corners thereof, the machine vision system 124 may determine a plane upon which the marker 130 is arranged. For example, the calibration data 134 may provide information such as parameters for deskewing the image data 126 or a portion thereof based on this assumption.

The marker 130 may be configured to provide information indicative of directionality. For example, the marker 130 may be asymmetrical in the sense that the image of the optical code of the marker 130 has a distinct "left" or "right", "top" or "bottom", and so forth. The calibration data 134 may comprise information indicative of a relative angle of rotation between the marker 130 and the image data 126 acquired by the imaging sensor 120(1). For example, the calibration data 134 may indicate the image data 126 is rotated +7 degrees relative to the marker 130.

The calibration data 134 may be indicative of a calibration relative to the marker 130 or the imaging sensor 120(1). For example, where the spatial coordinates, orientation, and so forth of the marker 130 are known, the calibration data 134 may be used to determine information about an imaging sensor 120(1), such as information about spatial coordinates of the imaging sensor 120(1), direction of the field of view 128, and so forth. In comparison, where details about the spatial coordinates of the imaging sensor 120(1), direction of the field of view 128, and so forth are known, the calibration data 134 may be used to determine information about the marker 130, such as spatial coordinates, orientation, and so forth.

The marker 130 may be configured to have predetermined physical dimensions such as a particular height and width. The machine vision system 124 may use information about the predetermined physical dimensions and the apparent size of the optical code within the image data 126 to generate information such as a distance from the imaging sensor 120(1) to the marker 130, providing scaling for objects appearing in the image data 126, and so forth.

The marker 130 may be configured in a rectangular shape to allow for use in situations, such as on the edge of a shelf of an inventory location 114. For example, the marker 130 may have a wide aspect ratio in which width of the optical code is greater than height. By increasing the size and area, the marker 130 may be readable by the machine vision system 124 at greater distances between the marker 130 and the imaging sensor 120(1). For example, the marker 130 may be about 11 cm wide and 3 cm tall, and the marker data encoded therein may be reliably read at a distance of 3 m or more, compared to a much shorter distance for a square marker of 3 cm by 3 cm storing the same marker data.

The optical code of the marker 130 may comprise a matrix code or two-dimensional grid array of graphical elements. For example, the graphical elements may comprise polygons such as circles, squares, triangles, and so forth. The graphical elements are arranged in "r" rows and "c" columns. In some implementations, c is greater than r, resulting in a marker 130 with a wide aspect ratio optical code that is wider than it is tall. As used in this disclosure, r and c may be positive nonzero integers. The color and placement in the array of the graphical elements encodes marker data. Color may include black, white, red, green, blue, and so forth. A first set of one or more colors may be used to represent a binary 0 while a second set of one or more colors may be used to represent a binary 1. For example, the first set of one or more colors may include white and green while the second set of one or more colors may include black and red.

The optical code may include a border that extends around a perimeter of the array. The border may be continuous and unbroken, such as solid black line. In some implementations, a second border may extend around the perimeter of the first border.

The facility 102 may include hundreds or thousands of imaging sensors 120(1), and corresponding markers 130 may be available to generate calibration data 134 as described above. The facility 102 may thus include many markers 130 arranged throughout. For example, markers 130 may be arranged on the floor, on the inventory locations 114, on objects such as totes 118 or users 116, and so forth. In situations where the markers 130 include optical codes that are at least partially visible under visible light, operation of the facility 102 may be improved by rendering the markers 130 less obtrusive such as described next.

In one implementation, an image of the optical code encoding the desired marker data may be blended with a source graphic image to produce the marker image as presented by the marker 130. The source graphic image may comprise a logo, text, or other visual indicia. For example, the source graphic image may comprise a brand name associated with a particular item 104 or a logo of the operator of the facility 102. The colors of the optical code, the source graphic image, or both may be adjusted to maintain machine readability by the machine vision system 124 while also maintaining human readability or aesthetics. For example, a source graphic image of a predominately orange logo may be blended with an optical code image using black and white to encode data. The resulting marker image may include portions of the logo that are within a boundary of a black graphical element to be rendered as dark orange. Similarly, the portions of the logo that are within a boundary of a white graphical element may be rendered as a light orange. As a result, the marker image maintains the machine readable optical code and presents human readable information as well. This is discussed in more detail below with regard to FIG. 7.

The markers 130 may be configured to present the optical code in non-visible wavelengths, such as infrared (IR) or ultraviolet. The imaging sensors 120(1) may be configured to detect these non-visible wavelengths. For example, the marker 130 may present the optical code using IR absorbent or reflective materials that may interact with a portion of the incident IR light. These materials may appear under visible light to be the same color. As a result, while the imaging sensor 120(1) is able to "see" the optical code of the marker 130, the unaided eye of the user 116 does not. In one implementation, the marker 130 may include a visible light layer comprising material that is generally reflective or absorptive of visible light but generally transmissive to IR light and beneath which the optical code is arranged. To the unaided eye, the marker 130 may appear as an unmarked surface, while the imaging sensor 120(1) may be able to detect the underlying optical code. This is discussed in more detail below with regard to FIG. 8.

It may be useful to present information in a visual format to the user 116 of the facility 102. For example, a stock keeping unit (SKU) or item name may be presented on an inventory location 114 to aid the user 116 in picking or placing. In this situation, the information such as print or graphics may be presented on materials that are generally transmissive to IR. For example, a dye or ink that is substantially transmissive to IR wavelengths may be used to print visual indicia onto the visible light layer. The user 116 sees the visual indicia, while the imaging sensor 120(1) using IR light is able to detect and generate an image of the underlying optical code. This is discussed in more detail below with regard to FIG. 8.

The markers 130 provide an ongoing reference from which the calibration data 134 may be generated in an automated fashion by the machine vision system 124. This improves efficiency of operation of the facility 102 by minimizing costs involved in recalibrating imaging devices 120(1). For example, recalibration using the markers 130 may take place continuously, at intervals such as once a day or once a week, upon an occurrence such as replacement or installation of an imaging sensor 120(1), and so forth. As a result, the machine vision system 124 may be able to provide more accurate information to the inventory management system 122, improving operation thereof.

Figure 2:
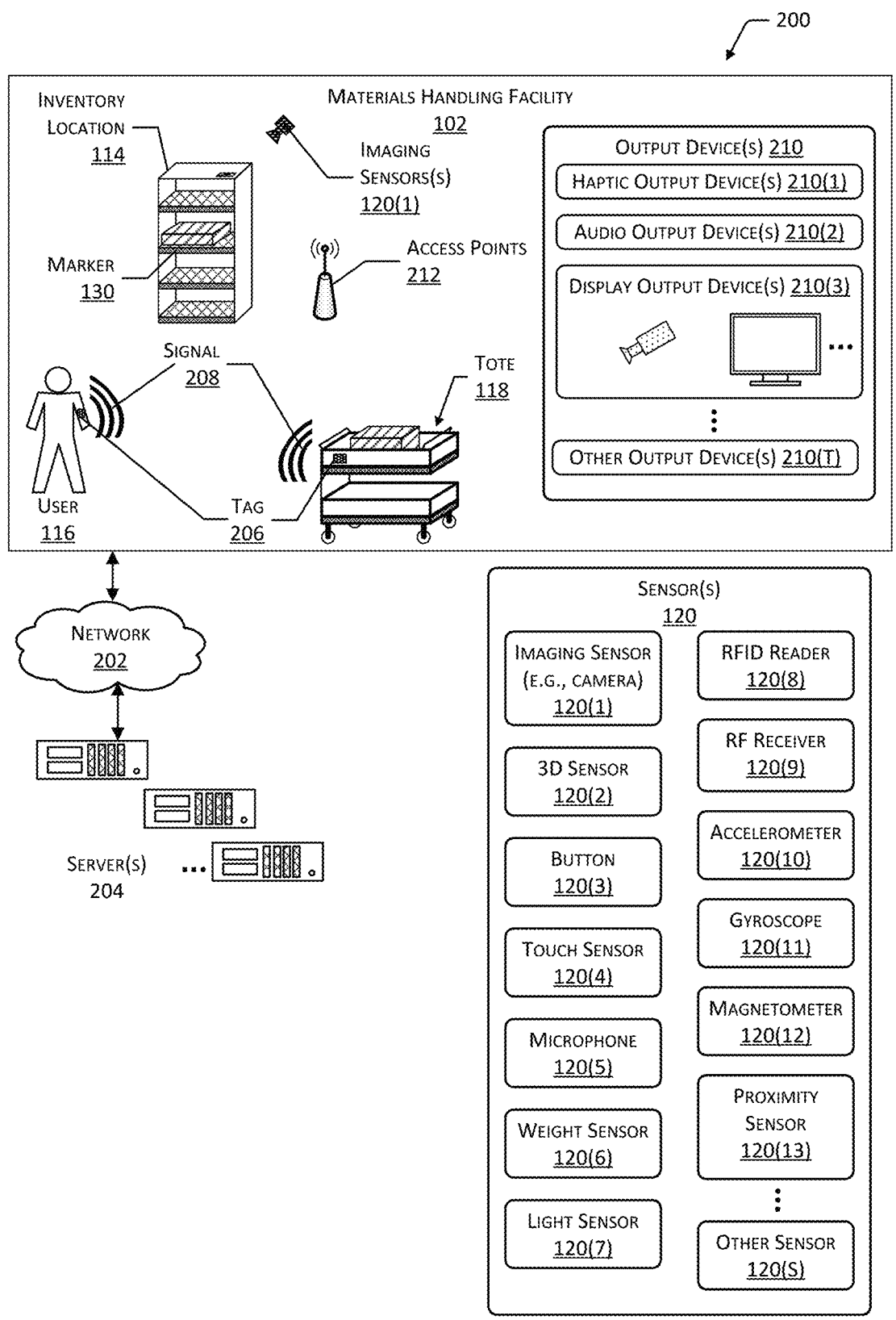
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence of the tag 206 to a corresponding sensor 120 or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) may be configured to detect light in one or more wavelengths including, but not limited to, terahertz, infrared, visible, ultraviolet, and so forth. The inventory management system 122 may use image data 126 acquired by the imaging sensors 120(1) during operation of the facility 102. For example, the inventory management system 122 may identify items 104, users 116, totes 118, and so forth, based at least in part on their appearance within the image data 126.

One or more 3D sensors 120(2) may also be included in the sensors 120. The 3D sensors 120(2) are configured to acquire spatial or three-dimensional data, such as depth information, about objects within a sensor field of view 128. The 3D sensors 120(2) may include range cameras, lidar systems, sonar systems, radar systems, structured light systems, stereo vision systems, optical interferometry systems, coded aperture systems, and so forth.

The inventory management system 122 may use the three-dimensional data acquired to identify objects, determine one or more of a location, orientation, or position of an object, and so forth. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may also be included in the sensors 120 and be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

The sensors 120 may include one or more microphones 120(5) that may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi®, Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data indicative of one or more of a presence or absence of an object, a distance to the object, characteristics of the object, and so forth. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

The sensors 120 may include other sensors 120(5) as well. For example, the other sensors 120(5) may include ultrasonic rangefinders, thermometers, barometric sensors, hygrometers, vibration sensors, biometric input devices, and so forth. Continuing the example, the biometric input devices may include, but not limited to, fingerprint readers, palm scanners, and so forth.

The facility 102 may include one or more access points 212 configured to establish one or more wireless networks. The access points 212 may use Wi-Fi®, NFC, Bluetooth®, or other technologies to establish wireless communications between a device and the network 202. The wireless networks allow the devices to communicate with one or more of the inventory management system 122, the sensors 120, the tags 206, communication devices of the totes 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) may be configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3), such as a display panel, may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive display output device 210(3). In comparison, a reflective display output device 210(3) relies on ambient light to present an image. For example, an electrophoretic display is a reflective display output device 210(3). Backlights or front lights may be used to illuminate the reflective display output device 210(3) to provide visibility of information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a SKU number. The display output devices 210(3) may also be configurable to vary the color of the text, such as using multicolor LED segments.

In some implementations, the display output devices 210(3) may be configurable to provide image or non-image output. For example, an electrophoretic display output device 210(3) with addressable pixels may be used to present images of text information or all of the pixels may be set to a solid color to provide a colored panel.

The display output devices 210(3) may be configured to maintain presentation of an image without ongoing application of electrical power. For example, the electrophoretic display may be able to maintain a particular configuration of electrophoretic elements in the absence of power, allowing ongoing presentation when power is removed. In some implementations, these displays may be referred to a "stable" or "bistable" displays. In another example, cholesteric displays may be configured to continue presentation after power is removed.

In some implementations, the display output devices 210(3) may be configured to present the marker 130. For example, an electrophoretic display output device 210(3) at an inventory location 114 may present a marker image comprising the optical code including a border.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
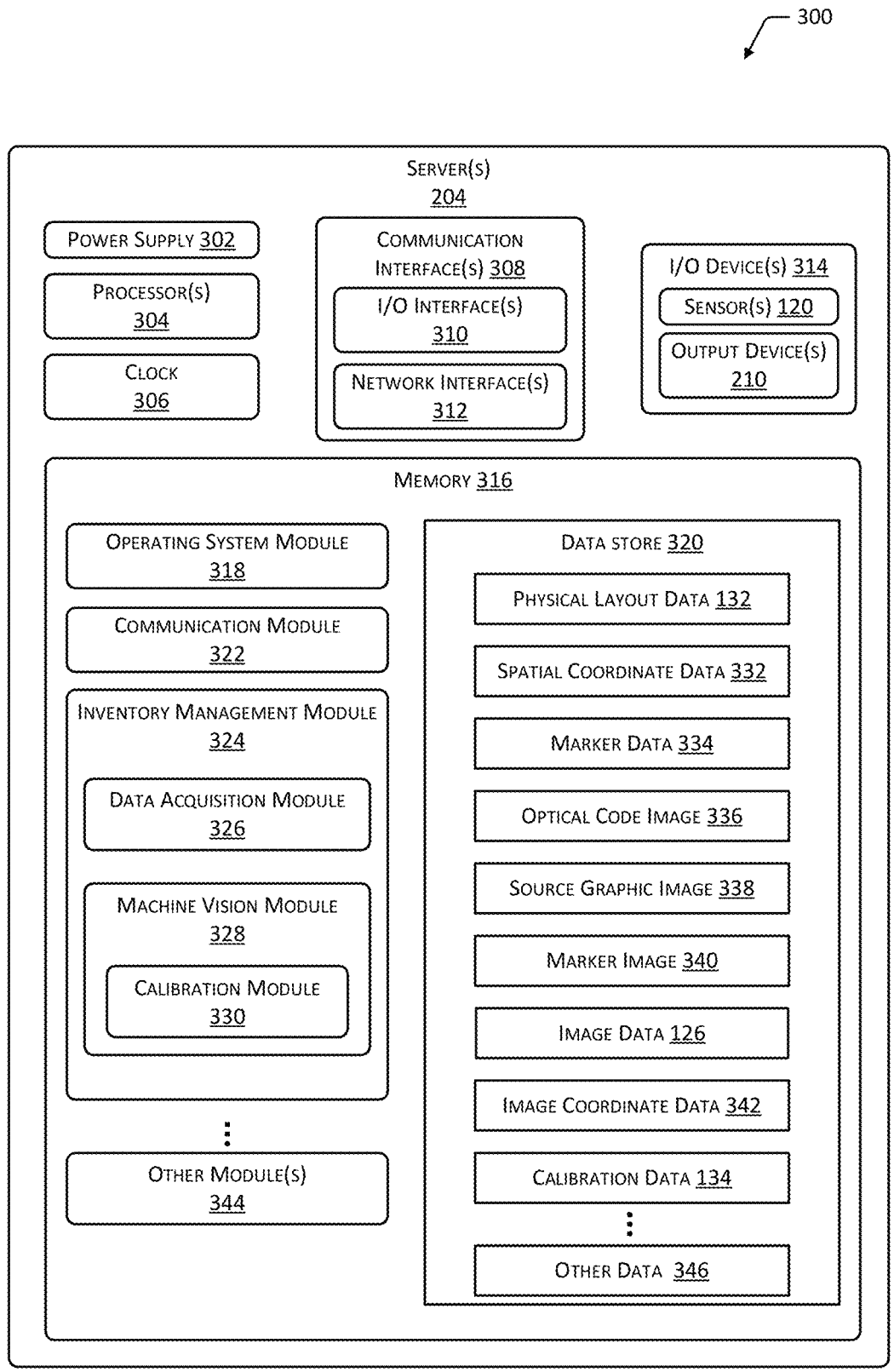
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services.

Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 210 such as one or more of a display output device 210(3), printer, audio speakers, and so forth. In some embodiments, the I/O devices 314 may be physically incorporated with the server 204 or may be externally placed.

The network interfaces 312 are configured to provide communications between the server 204 and other devices, such as totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi®, Bluetooth®, ZigBee®, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, other servers 204, or other devices. The communications may be authenticated, encrypted, and so forth.

The memory 316 may store an inventory management module 324. The inventory management module 324 may be configured to provide the inventory functions as described herein with regard to the inventory management system 122. For example, the inventory management module 324 may track items 104 between different inventory locations 114, to and from the totes 118, and so forth. Operation of the inventory management module 324 may use image data 126 obtained from the imaging sensors 120(1).

The inventory management module 324 may include one or more of a data acquisition module 326, a machine vision module 328, or a calibration module 330. The data acquisition module 326 may be configured to acquire and access information associated with operation of the facility 102. For example, the data acquisition module 326 may acquire information from the sensors 120.

The machine vision module 328 may perform one or more image processing functions on image data 126 using one or more of the following tools or techniques. The image processing functions may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 126. In another implementation, the EyeFace SDK as promulgated by Eyedea Recognition Ltd. of Prague, Czech Republic, may be used to process the image data 126. The OpenBR library and tools as originated by MITRE Corporation of Bedford, Mass., USA, and McLean, Va., USA, and promulgated by the OpenBR group at openbiometrics.org may also be used in some implementations for image processing.

In some implementations, the machine vision module 328 may perform facial recognition. For example, facial recognition may be used to identify the user 116. Facial recognition may include analyzing facial characteristics that are indicative of one or more facial features in an image, three-dimensional data, or both. For example, the face of the user 116 may be detected within one or more of images in the image data 126. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages".

The identification process using facial recognition may include comparing the eigenvectors of the image with those previously stored as facial characteristics to determine identity of the user 116. For example, the face of the user 116 may be identified using the "FaceRecognizer" class of the OpenCV library. The results may then be stored as identification data in the data store 320.

In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the identity of the user 116 in the image or to distinguish one user 116 from another.

Clothing recognition by the machine vision module 328 analyzes images to determine what articles of clothing, ornamentation, and so forth, the user 116 is wearing or carrying in the facility 102. For example, clothing recognition may be used to identify the user 116. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso of a user 116 as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

Gait recognition techniques analyze one or more of images, three-dimensional data, or other data, to assess how a user 116 moves over time. The user 116 may be identified at least in part by their gait. Gait comprises a recognizable pattern of movement of the user's 116 body that is affected by height, age, and other factors. Gait recognition may analyze the relative position and motion of limbs of the user 116. Limbs may include one or more arms, legs, and (in some implementations) the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity may be based on a combination of these or other recognition techniques. For example, the user 116 may be identified based on clothing recognition, gait recognition, facial recognition, detection of tags 206, weight data from weight sensors 126(6), and so forth. The different recognition techniques may be used in different situations or in succession. For example, clothing recognition and gait recognition may be used at greater distances between the user 116 and the imaging sensors 120(1) or when the user's 116 face is obscured from view by the imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102. By calibrating the imaging sensors 120(1) with the one or more markers 130, the accuracy of the tracking may be improved.

Other techniques such as artificial neural networks (ANN), active appearance models (AAM), active shape models (ASM), cascade classifiers, support vector machines, Haar detectors, local binary pattern (LBP) classifiers, and so forth, may also be used to process images. For example, the ANN may be trained using a supervised learning algorithm such that object identifiers are associated with images of particular objects within training images provided to the ANN. Once trained, the ANN may be provided with the images and may provide, as output, the object identifier.

Calibration of the imaging sensors 120(1) may improve performance of the system in identifying objects, improving accuracy of tracking information, and so forth. Calibration may be facilitated by using the markers 130. For example, the markers 130 may be associated in advance with particular spatial coordinate data 332. In another example, the markers may be installed and then later associated with the particular spatial coordinate data 332. The spatial coordinate data 332 designates particular spatial coordinates indicative of a location in the facility 102. The spatial coordinates may be expressed as distance along X, Y, and Z axes, relative to an origin. In another example, the spatial coordinate data 332 may designate a particular logical or functional location, such as "aisle 13, rack 5, shelf 6, center".

The markers 130 encode marker data 334, which may be stored in the data store 320. In one implementation, the marker data 334 may comprise a string or other value that may be used to indicate a particular marker 130, such as a random number, sequence number, serial number, and so forth. In another implementation, the marker data 334 may comprise the spatial coordinate data 332. For example, the marker data 334 may include the spatial coordinates. In one implementation, the marker data 334 may encode a 10-bit value.

In some implementations, the marker data 334 may be unique within a specified scope. For example, the marker data 334 may be a unique value within the scope of the inventory location 114, within a particular aisle 112, within a section of aisles 112, within a particular facility 102, or across several facilities 102.

The machine vision module 328 may generate an optical code image 336 that encodes the marker data 334. For example, the spatial coordinates may be encoded as a two-dimensional matrix code. In some implementations, the machine vision module 328 may generate the optical code image 336 using the ArUco library as promulgated by the Aplicaciones de la Visión Artificial of the University of Córdoba, Spain and described at http://www.uco.es/investiga/grupos/ava/node/1. The optical code image 336 may include one or more borders arranged around a perimeter of the optical code image 336.

In other implementations, the machine vision module 328 may use the optical code image 336 and a source graphic image 338 to produce a marker image 340. The source graphic image 338 may comprise an image of a logo, text, or other visual indicia. For example, the source graphic image 338 may be information intended for presentation to the user 116. The machine vision module 328 may blend the optical code image 336 and the source graphic image 338 to produce the marker image 340. For example, the OpenCV class "Blender" may be used to blend the images. This is discussed in more detail below with regard to FIG. 7.

In other implementations, the marker 130 may present the optical code image 336 without blending, such that the optical code image 336 is the same as the marker image 340. For example, the marker 130 may comprise the optical code image 336 printed or otherwise disposed on a label or presented on a display output device 210(3).

The markers 130 may be generated in advance of their use, and the marker data 334 encoded therein may be later associated with data having particular meaning. For example, the markers 130 may be preprinted as labels with each label encoding in its respective marker data 334 values from 0000 to 1024. The resulting markers 130 may then be emplaced within the facility 102, either at pre-designated places or in an ad-hoc or unassigned fashion. Following emplacement, the physical layout data 132 may be updated to associate the particular value of the marker data 334 with other information, such as particular spatial coordinate data 332. For example, after installation, the marker 130 encoding marker data of "0234" may be associated with the spatial coordinates of (17, 47, 2).

The machine vision module 328 may access the image data 126 acquired by an imaging sensor 120(1). The image data 126 may include a marker image 340 therein. For example, the field of view 128 and corresponding image acquired by the imaging sensor 120(1) may include a marker 130 mounted to an inventory location 114. The machine vision module 328 may detect the presence of the marker image 340 within the image data 126. One implementation of detection of the marker image 340 in the image data 126 is described below with regard to Code Implementation 1.

CODE IMPLEMENTATION 1

```
package com.company.abctintin.marker;
import java.util.AbstractMap.SimpleEntry;
import java.util.ArrayList;
import java.util.Collections;
import java.util.Iterator;
import java.util.List;
import org.opencv.core.Core;
import org.opencv.core.CvType;
import org.opencv.core.Mat;
```

CODE IMPLEMENTATION 1
-continued

```
import org.opencv.core.MatOfDouble;
import org.opencv.core.Rect;
import org.opencv.core.Size;
import org.opencv.imgproc.Imgproc;
import com.company.abctintin.exceptions.InvalidMarkerSizeException;
import com.company.abctintin.exceptions.ParallelDiagonalsException;
/**
 * Class implementing a rectangular marker detector
 */
public class RectangularMarkerDetector extends MarkerDetector
{
    // These values indicate the size to warp a candidate
    // marker to E.g. warp a rectangular marker to be 128x32
    private static final double MARKER_WARP_WIDE_WIDTH = 128;
    private static final double MARKER_WARP_WIDE_HEIGHT = 32;
    private final double markerWarpWidth;
    private final double markerWarpHeight;
    /**
     * Default constructor
     */
    public RectangularMarkerDetector( ) {
        super( );
        markerWarpWidth = MARKER_WARP_WIDE_WIDTH;
        markerWarpHeight = MARKER_WARP_WIDE_HEIGHT;
    }
    /**
     * @{inheritDoc}
     */
    @Override
    public List<Marker> detect(final Mat image, Mat
cameraMatrix, MatOfDouble distortionCoefficients, double
markerSize)
        throws InvalidMarkerSizeException,
ParallelDiagonalsException {
        Mat grey = new Mat( );
        // A 3 channel image
        if (image.type( ) == CvType.CV_8UC3) {
            Imgproc.cvtColor(image, grey,
Imgproc.COLOR_BGR2GRAY);
        } else {
            image.copyTo(grey);
        }
        List<Marker> detectedMarkers = new ArrayList< > ( );
        // Do threshold the image and detect contours
        Mat thres = new Mat( );
        Imgproc.adaptiveThreshold(grey, thres, 255,
Imgproc.ADAPTIVE_THRESH_MEAN_C,
Imgproc.THRESH_BINARY_INV,
            (int) THRESHOLD_1, THRESHOLD_2);
        // Find all rectangles in the thresholded image
        List<MarkerCandidate> markerCandidates =
detectRectangles(thres);
        // Identify the markers
        for (MarkerCandidate candidate : markerCandidates) {
            Mat cannonicalMarkers;
            SimpleEntry<Integer, Integer> detectionResult;
            // Check if the first edge is the longer edge, and
            // if it is not the longer edge used, swap the
            // aspect ratio and rotate the image.
            if
(OpenCVUtils.pointDistanceSquared(candidate.getCorners( ).get(0),
candidate.getCorners( ).get(1)) >
OpenCVUtils.pointDistanceSquared(
                    candidate.getCorners( ).get(1),
candidate.getCorners( ).get(2))) {
                cannonicalMarkers = warp(grey, new
Size(markerWarpWidth, markerWarpHeight),
candidate.getCorners( ));
            } else {
                cannonicalMarkers = warp(grey, new
Size(markerWarpHeight, markerWarpWidth),
candidate.getCorners( ));
                // Rotate image
                Core.transpose(cannonicalMarkers,
cannonicalMarkers);
```

CODE IMPLEMENTATION 1

```
            Core.flip(cannonicalMarkers,
cannonicalMarkers, 1);
        }
            Imgproc.threshold(cannonicalMarkers,
cannonicalMarkers, BINARY_THRESHOLD_VALUE,
MAX_VALUE_BINARY_TRESHOLD, Imgproc.THRESH_BINARY |
Imgproc.THRESH_OTSU);
        if (!isRectangleUpsideDown(cannonicalMarkers)) {
            detectionResult =
fiducialMarkerDetectRectangular(cannonicalMarkers, 0);
        } else {
            detectionResult =
fiducialMarkerDetectRectangular(cannonicalMarkers, 1);
        }
        if (detectionResult.getKey( ) != -1) {
            refineCandidateLines(candidate);
            // Sort the points so that they are in
            // the same order no matter the camera
            // orientation
candidate.rotateCorners(detectionResult.getValue( ) - 4);
            detectedMarkers.add(new
Marker(detectionResult.getKey( ) , candidate.getCorners( )));
        }
        cannonicalMarkers.release( );
    }
    // Sort by id
    Collections.sort(detectedMarkers);
    // There might be still the case that a marker is
    // detected twice because of the double border
    // indicated earlier, detect and remove these cases
    int previousId = -1;
    for (Iterator<Marker> it = detectedMarkers.iterator( );
it.hasNext( );) {
        Marker marker = it.next( );
        int currentId = marker.getId( );
        if (currentId == previousId) {
            marker.release( );
            it.remove( );
        }
        previousId = currentId;
    }
    // Detect the position of detected markers if desired
    if (cameraMatrix.rows( ) != 0 && markerSize > 0) {
        for (Marker marker : detectedMarkers) {
            marker.calculateExtrinsics(markerSize,
cameraMatrix, distortionCoefficients);
        }
    }
    // Clean-up
    grey.release( );
    thres.release( );
    return detectedMarkers;
}
// Check that extra 3 bits are black
private boolean isRectangleUpsideDown(Mat in) {
    final int markerRows = 4;
    final int markerCols = 16;
    final int markerInnerCols = 14;
    int sheight = in.rows( )/markerRows;
    int swidth = in.cols( )/markerCols;
    for (int i = markerInnerCols - 2; i <=
markerInnerCols; i++) {
        Mat square = in.submat(new Rect(i * swidth, 2 *
sheight, swidth, sheight));
            int nZ = Core.countNonZero(square);
            if (nZ > (swidth * sheight)/2) {
                return true;
            }
    }
    return false;
}
private SimpleEntry<Integer, Integer>
fiducialMarkerDetectRectangular(Mat in, int skip) {
    // Markers are divided in 16x4 regions, of which the
    // inner 14x2 belongs to marker info and the external
    // border should be entirely black
    final int markerRows = 4;
    final int markerCols = 16;
    final int markerInnerRows = 2;
    final int markerInnerCols = 14;
    int sheight = in.rows( )/markerRows;
    int swidth = in.cols( )/markerCols;
    for (int y = 0; y < markerRows; y++) {
        int inc = markerCols - 1;
        if (y == 0 || y == markerRows - 1) {
            inc = 1; // For first and last row, check the
whole border
        }
        for (int x = 0; x < markerCols; x += inc) {
            int xStart = x * swidth;
            int yStart = y * sheight;
            Mat square = in.submat(new Rect(xStart,
yStart, swidth, sheight));
            int nZ = Core.countNonZero(square);
            if (nZ > (swidth * sheight)/2) {
                // Cannot be a marker because the border
element is not black!
                return new SimpleEntry< > (-1, -1);
            }
            square.release( );
        }
    }
    // Now,
    Mat bits = Mat.zeros(5, 5, Cv-Type.CV_8UC1);
    // Get information (for each inner square, determine
    // if it is black or white)
    for (int y = 0; y < markerInnerRows; y++) {
        for (int x = 0; x < markerInnerCols; x++) {
            int xStart = (x + 1) * swidth;
            int yStart = (y + 1) * sheight;
            Mat square = in.submat(new Rect(xStart,
yStart, swidth, sheight));
            int nZ = Core.countNonZero(square);
            if (nZ > (swidth * sheight)/2) {
                byte[ ] udata = {1};
                int arrayIndx = y * markerInnerCols + x -
skip * 3;
                if (arrayIndx >= 0 && arrayIndx <= 24) {
                    int sqx = arrayIndx % 5;
                    int sqy = arrayIndx/5;
                    bits.put(sqy, sqx, udata);
                }
            }
            square.release( );
        }
    }
    // Check all possible rotations
    Mat[ ] rotations = new Mat[4];
    rotations[0] = bits;
    int[ ] dists = new int[4];
    dists[0] = hammDistMarker(rotations[0]);
    int minDist = dists[0];
    int nRotations = 0;
    for (int i = 1; i < 4; i++) {
        // Rotate
        rotations[i] = rotate(rotations[i - 1]);
        // Get the Hamming distance to the nearest
        // possible word
        dists[i] = hammDistMarker(rotations[i]);
        if (dists[i] < minDist) {
            minDist = dists[i];
            nRotations = i;
        }
    }
    if (minDist != 0) {
        return new SimpleEntry< > (-1, -1);
    }
    int matID = 0;
    bits = rotations [nRotations];
    byte[ ] udata = new byte[(int) (bits.total( ) *
bits.channels( ))];
    bits.get(0, 0, udata);
    for (int y = 0; y < 5; y++) {
        matID <<= 1;
```

-continued

```
CODE IMPLEMENTATION 1 if (udata[y * bits.cols( ) + 1] > 0) {
          matID |= 1;
        }
        matID <<= 1;
        if (udata[y * bits.cols( ) + 3 ] > 0) {
          matID |= 1;
        }
      }
      //Clean-up
      bits.release( );
      for (int i = 0; i < 4; i++) {
        rotations[i].release( );
      }
      new SimpleEntry< > (matID, nRotations);
    }
}
```

Once the machine vision module 328 has detected the marker image 340 within the image data 126, the calibration module 330 may generate calibration data 134. For example, the calibration module 330 may access the spatial coordinate data 332 associated with the marker 130. The calibration module 330 may determine image coordinate data 342 indicative of a particular location within the image data 126 of a particular portion of the marker 130. For example, the image coordinate data 342 may determine a row and column in the image data 126 at which an upper left corner of the marker image 340 is depicted. The row and column may then be associated with the spatial coordinate data 332 previously stored for that upper left corner. Continuing the example, the calibration data 134 may comprise a mapping, such as designating the image coordinate data 342 of (67, 113) as corresponding to the spatial coordinate data 332 indicative of "aisle 13, rack 5, shelf 6, center".

The machine vision module 328 may generate other calibration data 134, such as deskewing parameters, rotational offset, and so forth. For example, the machine vision module 328 may assume the marker 130 to be flat, and thus the corners of the marker image 340 describe a plane. Based on this, the calibration data 134 may indicate a relative angle between the plane of the marker image 340 and the imaging sensor 120(1). In another example, the machine vision module 328 may determine an angular offset indicative of a rotation of the marker image 340 relative to the direction of the image data 126. Continuing the example, the calibration data 134 may indicate that the image depicted in the image data 126 is rotated counterclockwise 5 degrees relative to the orientation of the marker image 340.

In other implementations, other calibration data 134 may be generated by the calibration module 330. For example, the calibration data 134 may indicate color compensation values to account for different imaging sensors 120(1), changing light conditions, and so forth.

The inventory management module 324 may use the calibration data 134 to assist in performing functions such as tracking objects, identifying objects, and so forth. For example, the calibration data 134 may be used to determine the location in the facility 102 where the image data 126 was acquired based on the marker data 334. The determination is used to generate location data about the user 116.

In some implementations, the calibration data 134 may be provided to the originating imaging sensor 120(1). For example, deskew and rotation information may be provided to the imaging sensor 120(1), which may then pre-process the image data 126 prior to delivery to the inventory management module 324.

Other modules 344 may also be present in the memory 316, as well as other data 346 in the data store 320. For example, the other modules 344 may include an accounting module. The accounting module may be configured to use image data 126, as calibrated by the calibration data 134, to determine an account to bill for items 104 picked by a particular user 116. The other data 346 may comprise information such as billing account data, camera configuration data, and so forth.

Figure 4:
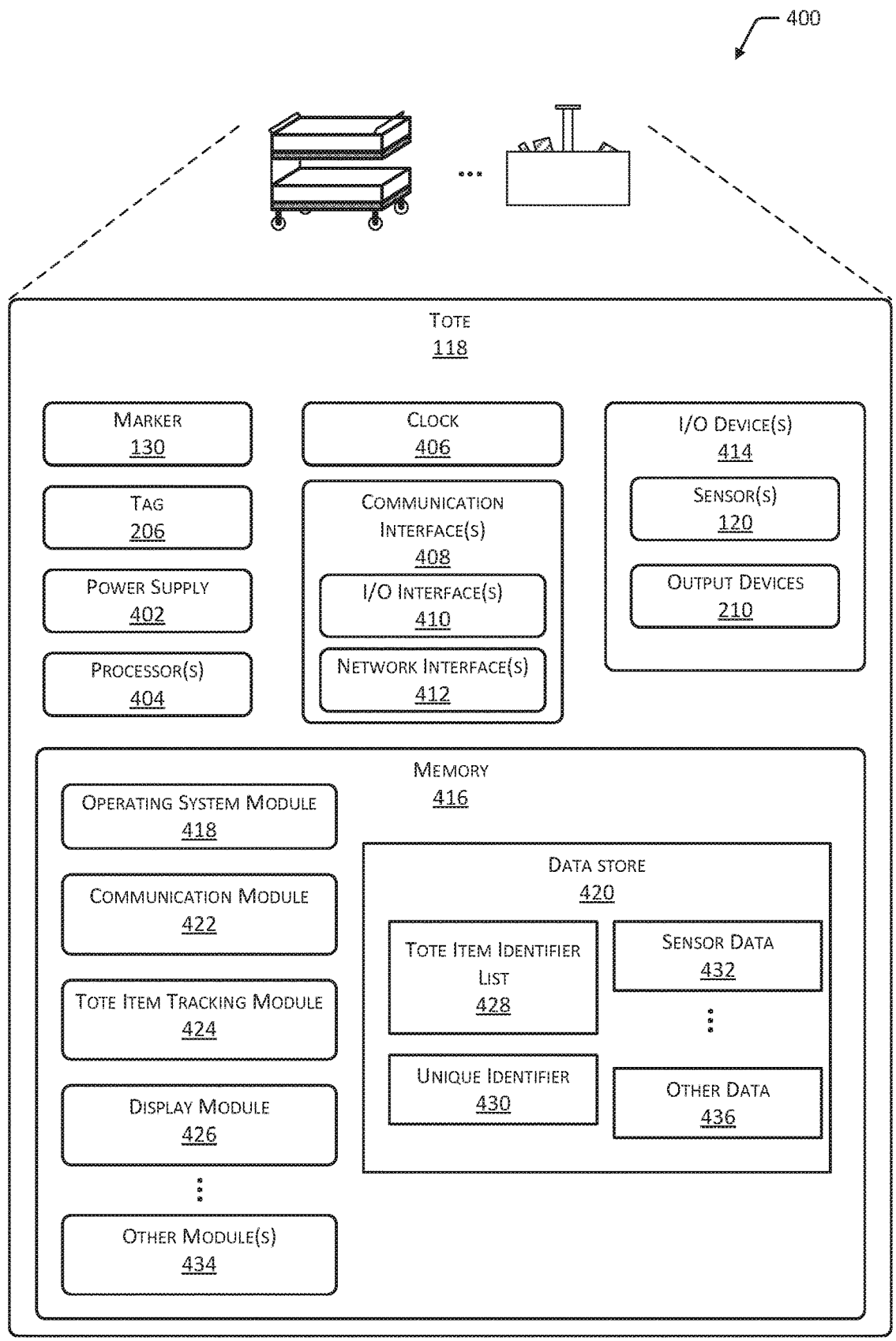
FIG. 4 illustrates a block diagram of a tote that may include a marker, according to some implementations.

FIG. 4 illustrates a block diagram 400 of the tote 118, according to some implementations. In some implementations, the tote 118 may have one or more markers 130 affixed or otherwise presented thereon. The marker 130 may be used to identify the tote 118, designate a particular portion of the tote 118 such as a front or side, and so forth.

The tote 118 may also include a tag 206. The tag 206 may be affixed to, integral with, or otherwise associated with the tote 118. In some implementations, the tote 118 may have identifiers or other indicia thereupon. For example, a machine-readable optical code, such as a barcode, may be affixed to a side of the tote 118.

The tote 118 may also include a power supply 402. The power supply 402 may be configured to provide electrical power suitable for operating the components in the tote 118. The power supply 402 may comprise one or more of photovoltaic cells, batteries, wireless power receivers, fuel cells, flywheels, capacitors, and so forth.

The tote 118 may include one or more hardware processors 404 (processors) configured to execute one or more stored instructions. The processors 404 may comprise one or more cores of different types. For example, the processors 404 may include application processor units, graphic processing units, and so forth.

One or more clocks 406 may provide information indicative of date, time, ticks, and so forth. For example, the processor 404 may use data from the clock 406 to generate timestamps, trigger a preprogrammed action, and so forth.

The tote 118 may include one or more communication interfaces 408, such as I/O interfaces 410, network interfaces 412, and so forth. The communication interfaces 408 may enable the tote 118, or components thereof, to communicate with other devices or components. The communication interfaces 408 may include one or more I/O interfaces 410. The I/O interfaces 410 may comprise I2C, SPI, USB, RS-232, and so forth.

The I/O interface(s) 410 may couple to one or more I/O devices 414. The I/O devices 414 may include one or more of the input devices such as the sensors 120. As described above, the sensors 120 may include imaging sensors 120(1), weight sensors 120(6), RFID readers 120(8), and so forth. The I/O devices 414 may also include output devices 210 such as haptic output devices 210(1), audio output devices 210(2), display output devices 210(3), and so forth. For example, the tote 118 may include other output devices 210(T) such as lights that may be activated to provide information to the user 116. In some implementations, I/O devices 414 may be combined. For example, a touchscreen display may incorporate a touch sensor 120(4) and a display output device 210(3). In some embodiments, the I/O devices 414 may be physically incorporated with the tote 118 or may be externally placed.

The network interfaces 412 are configured to provide communications between the tote 118 and other devices, routers, servers 204, access points 212, and so forth. The network interfaces 412 may include devices configured to couple to PANs, LANs, WANs, and so forth. For example, the network interfaces 412 may include devices compatible with Ethernet, Wi-Fi®, Bluetooth®, ZigBee®, and so forth.

The tote 118 may also include one or more busses or other internal communications hardware or software that allow for the transfer of data between the various modules and components of the tote 118.

As shown in FIG. 4, the tote 118 includes one or more memories 416. The memory 416 may comprise one or more non-transitory CRSM as described above in FIG. 3. The memory 416 provides storage of computer-readable instructions, data structures, program modules, and other data for the operation of the tote 118. A few example functional modules are shown stored in the memory 416, although the same functionality may alternatively be implemented in hardware, firmware, or as a system on a chip (SoC).

The memory 416 may include at least one OS module 418. The OS module 418 is configured to manage hardware resource devices such as the communication interfaces 408, the I/O devices 414, and so forth, and provide various services to applications or modules executing on the processors 404. The OS module 418 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 416 may be a data store 420 and one or more of the following modules. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other totes 118, network attached storage devices, and so forth.

A communication module 422 may be configured to establish communications with one or more of other totes 118, servers 204, or other devices. The communications may be authenticated, encrypted, and so forth.

The memory 416 may also store a tote item tracking module 424. The tote item tracking module 424 may be configured to maintain a list of items 104, which are associated with the tote 118. For example, the tote item tracking module 424 may receive input from a user 116 by way of a touch screen display with which the user 116 may enter information indicative of the item 104 placed in the tote 118. In another example, the tote item tracking module 424 may receive input from the I/O devices 414, such as the weight sensor 120(6) or an RFID reader 120(8). The tote item tracking module 424 may send the list of items 104 to the inventory management system 122. The tote item tracking module 424 may also be configured to receive information from the inventory management system 122. For example, a list of items 104 to be picked may be presented within a user interface on the display output device 210(3) of the tote 118.

The memory 416 may include a display module 426. The display module 426 may be configured to present information, such as information received from the one or more servers 204 or generated onboard the tote 118, using one or more of the output devices 210. For example, the display module 426 may be configured to receive user interface data provided by a user interface module of the inventory management system 122. By processing user interface data, the user interface may be presented to the user 116 by way of the output devices 210 of the tote 118. For example, the user interface may include haptic output from the haptic output device 210(1), audio output from the audio output devices 210(2), images presented on the display output devices 210(3), activation of lights or other output from the other output devices 210(T), or a combination thereof.

The data store 420 may store a tote item identifier list 428. The tote item identifier list 428 may comprise data indicating one or more items 104 associated with the tote 118. For example, the tote item identifier list 428 may indicate the items 104 that are present in the tote 118. The tote item tracking module 424 may generate or otherwise maintain a tote item identifier list 428.

A unique identifier 430 may also be stored in the memory 416. In some implementations, the unique identifier 430 may be stored in rewritable memory, write-once-read-only memory, and so forth. For example, the unique identifier 430 may be burned into a one-time programmable non-volatile memory, such as a programmable read-only memory (PROM). In some implementations, the unique identifier 430 may be part of a communication interface 408. For example, the unique identifier 430 may comprise a media access control (MAC) address associated with a Bluetooth® interface.

The data store 420 may also store sensor data 432. The sensor data 432 may be acquired from the sensors 120 onboard the tote 118. Other modules 434 may also be stored within the memory 416. For example, a user authentication module may be configured to receive input and authenticate or identify a particular user 116. Other data 436 may also be stored within the data store 420. For example, the other data 436 may include tote configuration settings, user interface preferences, and so forth.

Figure 5:
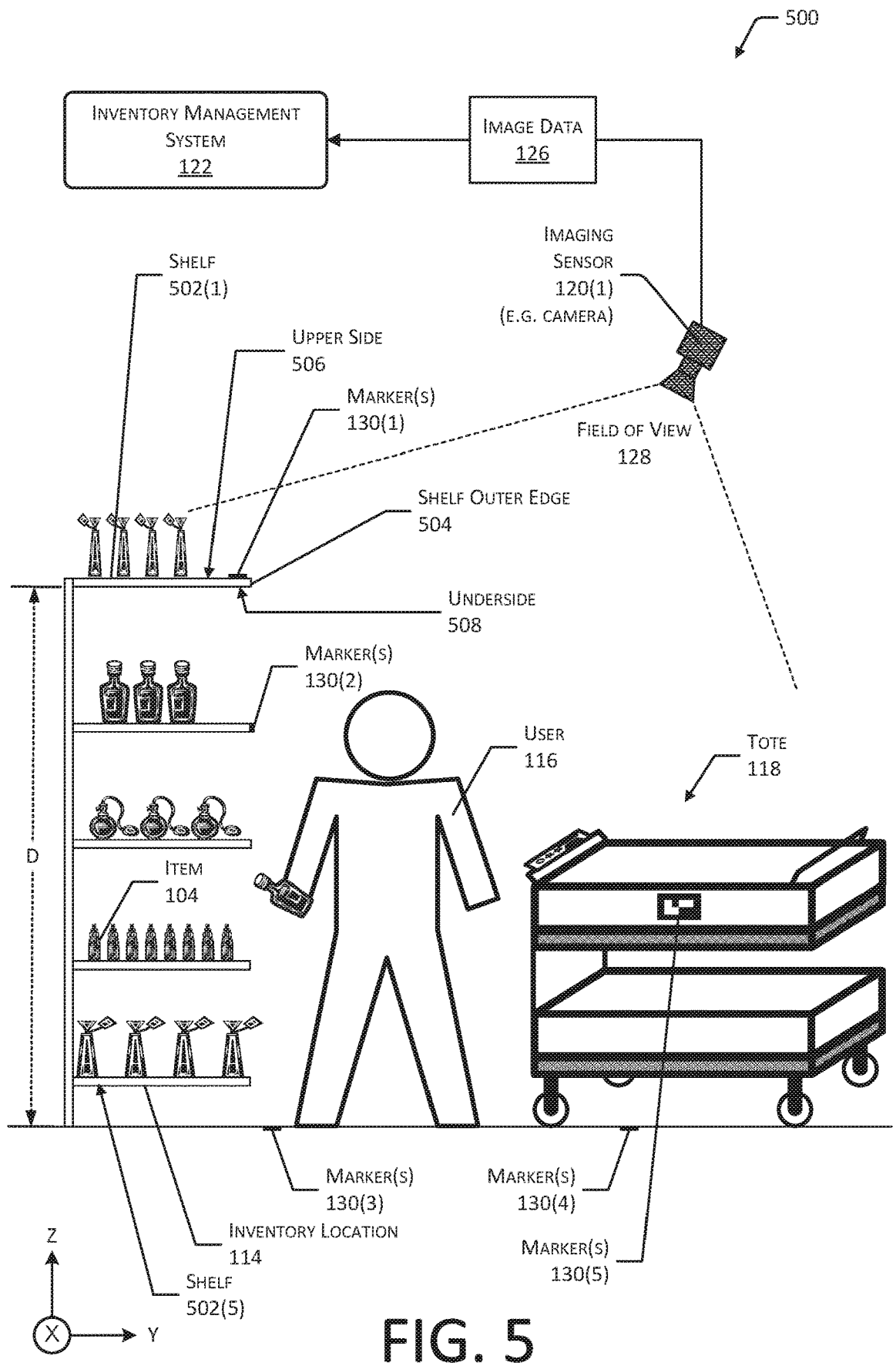
FIG. 5 illustrates a side view of a portion of the facility and placement of markers in the facility, according to some implementations.

FIG. 5 illustrates a side view 500 of a portion of the facility 102. This illustration depicts inventory locations 114 comprising shelves 502(1)-502(5) mounted to a rack. Each shelf 502 may have a shelf outer edge 504. For example, the shelf outer edge 504 may be a portion of the shelf 502 that is proximate to the aisle 112. The shelf 502 may have an upper side 506 and an underside 508.

One or more markers 130(1), 130(2), . . . , 130(M) may be arranged in the facility 102 to present marker images 340. For example, a marker 130(1) may be presented on an upper side 506 of an uppermost shelf 502 while another marker 130(2) may be presented on a shelf outer edge 504. Other markers 130(3)-130(5) may be on the floor, on a tote 118(5), or in other locations. For example, the floor may comprise a flooring system, such as tiles, concrete, carpet, and so forth. The marker 130 may be mounted on, embedded within, dyed, or woven into the flooring system. For example, the marker 130 may be printed onto tiles, etched into concrete, and so forth. In another example, the flooring system may comprise different materials of different colors to produce the optical code of the marker 130.

The markers 130 may be affixed to a surface, embedded within or under another surface or structure, projected onto a surface, presented by a display output device 210(3), and so forth. For example, the marker 130(1) may comprise adhesive stickers applied to the shelf 502. In another example, the marker 130(2) may be printed and held by a clip on the shelf outer edge 504. The marker 130(3)-130(4) may be embossed or imprinted into floor tiles. For example, a different texture on the tile may produce an apparent change in color suitable for presenting the marker image 340.

The sensors 120 may also be deployed within the facility 102. For example, the imaging sensors 120(1) may be deployed overhead to acquire image data 126 such as images of the inventory locations 114, the users 116, and so forth, during operation of the facility 102. The inventory management system 122 may use the image data 126 or other sensor data to facilitate operation of the facility 102. For example, the image of the user 116 removing an item 104 from the shelf 504(2) inventory location 114 may be used to change item quantity information, assign a charge for the item 104 to a particular user 116, and so forth.

In some implementations, the markers 130 may be placed to minimize or reduce their visibility to the user 116 during typical operation of the facility 102. For example, the marker 130(1) is located on the upper side 506 of the shelf 502(1), at a distance "D" above the floor. In this position, the typical user 116 will be unable to see the marker 130(1). The distance D may be at least 165 cm above the floor. However, the field of view 128 of the overhead imaging sensor 120(1) includes the marker 130. As a result, the acquired image data 126 includes the marker image 340 presented by the marker 130(1).

Figure 6:
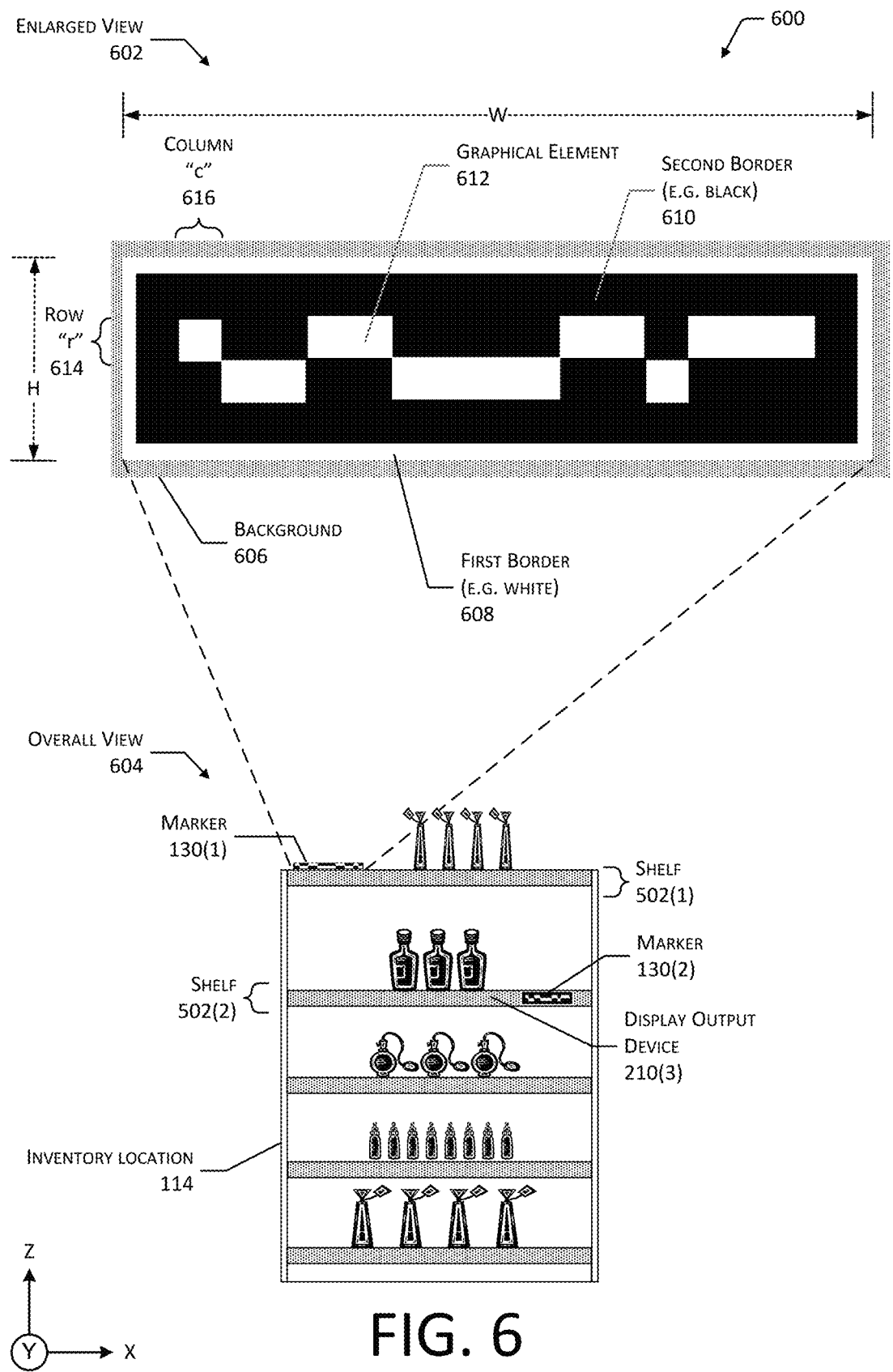
FIG. 6 illustrates a marker and possible placement of the marker in the facility, according to some implementations.

FIG. 6 illustrates views 600 of a marker 130 and possible placement of the marker 130 in the facility 102, according to some implementations. FIG. 6 illustrates an enlarged view 602 of a marker 130 and an overall view 604 of the placement of the marker 130 in the facility 102.

The enlarged view 602 depicts a single marker 130. The marker 130 may be placed on a background 606. For example, the background 606 may comprise a substrate, carrier, surface upon which the marker 130 is disposed, a portion of a display output device 210(3), and so forth. The marker 130 may comprise one or more of a first border 608 or a second border 610. The first border 608 and second border 610 may be continuous and uninterrupted, and may have colors different from each other. For example, the first border 608 may be colored white and provide an unbroken white boundary around the perimeter of the second border 610. The second border 610 may be colored black and provide an unbroken black boundary around a perimeter of an array of graphical elements 612. In other implementations, the first border 608 and second border 610 may have different colors from those depicted here. For example, the first border 608 may be black and the second border 610 may be dark blue. In implementations where the first border 608 and the second border 610 are present in the marker 130, they may be selected to have colors with a contrast exceeding a threshold value, such as black and white.

In some implementations the second border 610 may extend at a distance that is at least equal to a height or width of a graphical element away from the array of rows 614 and columns 616. For example, the graphical elements 612 may be squares measuring 8 mm on a side. The height of the second border 610 above and below the array of graphical elements 612 may be 8 millimeters, while the width of the second border 610 to left and right of the array may also be 8 millimeters. In another example, the array of graphical elements 612 may include two additional rows 614 and columns 616 that form a perimeter of graphical elements 612. These additional rows 614 and columns 616 may be set to a particular color (such as black) to provide the second border 610 and are not used to encode information.

Information such as the marker data 334, error correction data, and so forth, is encoded within the marker 130 by a placement and color of particular graphical elements 612. The graphical elements 612 may be arranged in a two-dimensional array comprising rows "r" 614 and columns "c" 616.

The graphical elements 612 may comprise irregular shapes or polygons such as circles, squares, triangles, and so forth. Within the same marker 130, the graphical elements 612 may have a consistent size and shape. For example, the graphical elements 612 may comprise squares, with each square having a height and width that are substantially the same, such as within a 10% tolerance of one another. In some implementations, each of the graphical elements 612 in the array may also be substantially the same shape and size. For example, the graphical elements 612 may comprise squares of about the same size.

The colors used to encode information in the graphical elements 612 may include black, white, red, green, blue, and so forth. A first set of one or more colors may be used to represent a binary 0 while a second set of one or more colors may be used to represent a binary 1. For example, the first set of one or more colors may include white and green while the second set of one or more colors may include black and red.

Graphical elements 612 may be arranged in a wide format such that there are more columns "c" 616 than rows "r" 614. As a result, the marker 130 has a wide aspect ratio, having a width "W" that is greater than height "H". The width W and height H of the marker 130 may be adjusted to allow for placement of the marker 130 at various points within the facility 102. For example, the height H may be such that the marker 130 may be placed on the shelf outer edge 504. Continuing example, in some implementations, the width W of the two-dimensional matrix code may be between 11 and 12 cm and the height H may be between 2 and 4 cm.

The overall view 604 depicts a frontal view of the shelves 502. As described above, the markers 130 may be presented at different locations within the facility 102. In this illustration, the marker 130(1) is arranged on an upper side 506 of the shelf 502(1). For example, the marker 130(1) may comprise an adhesive label affixed to the shelf 502(1). In comparison, the marker 130(2) is presented on the shelf 502(2) by a display output device 210(3) affixed to the inventory location 114. For example, the display output device 210(3) may comprise an electrophoretic display upon which the marker image 340 of the marker 130 is presented. The marker image 340 presented by the display output device 210(3) may include one or more of the first border 608 or the second border 610.

In some implementations the display output device 210(3) may be configured to present the marker 130 with a duration such that the marker 130 is visible to the imaging sensor 120(1), while not being readily perceptible to the user 116. In one implementation, a presentation duration value may be set for controlling operation of the display output device 210(3). The presentation duration value is indicative of a duration to present the image of the marker 130. The presentation duration value may be expressed as units of time (such as milliseconds), number of frames, and so forth. For example, the presentation duration value may specify that the marker 130 is to be presented for less than 50 milliseconds at a time (consecutively). Continuing the example, the display output device 210(3) may be able to present images with a refresh or redraw rate of 20 frames per second (FPS). The imaging sensors 120(1) may be able to acquire image data 126 at a rate of 40 frames per second. Based on the presentation duration value, the display output device 210(3) may be configured to present the image of the marker 130 for one frame out of every 20 displayed in a single second. The imaging sensors 120(1) may acquire image data 126 that includes the appearance of the marker 130 every second. As a result, the marker 130 may be imperceptible or minimally perceptible to the user 116 while remaining available for use by the machine vision system 124.

Figure 7:
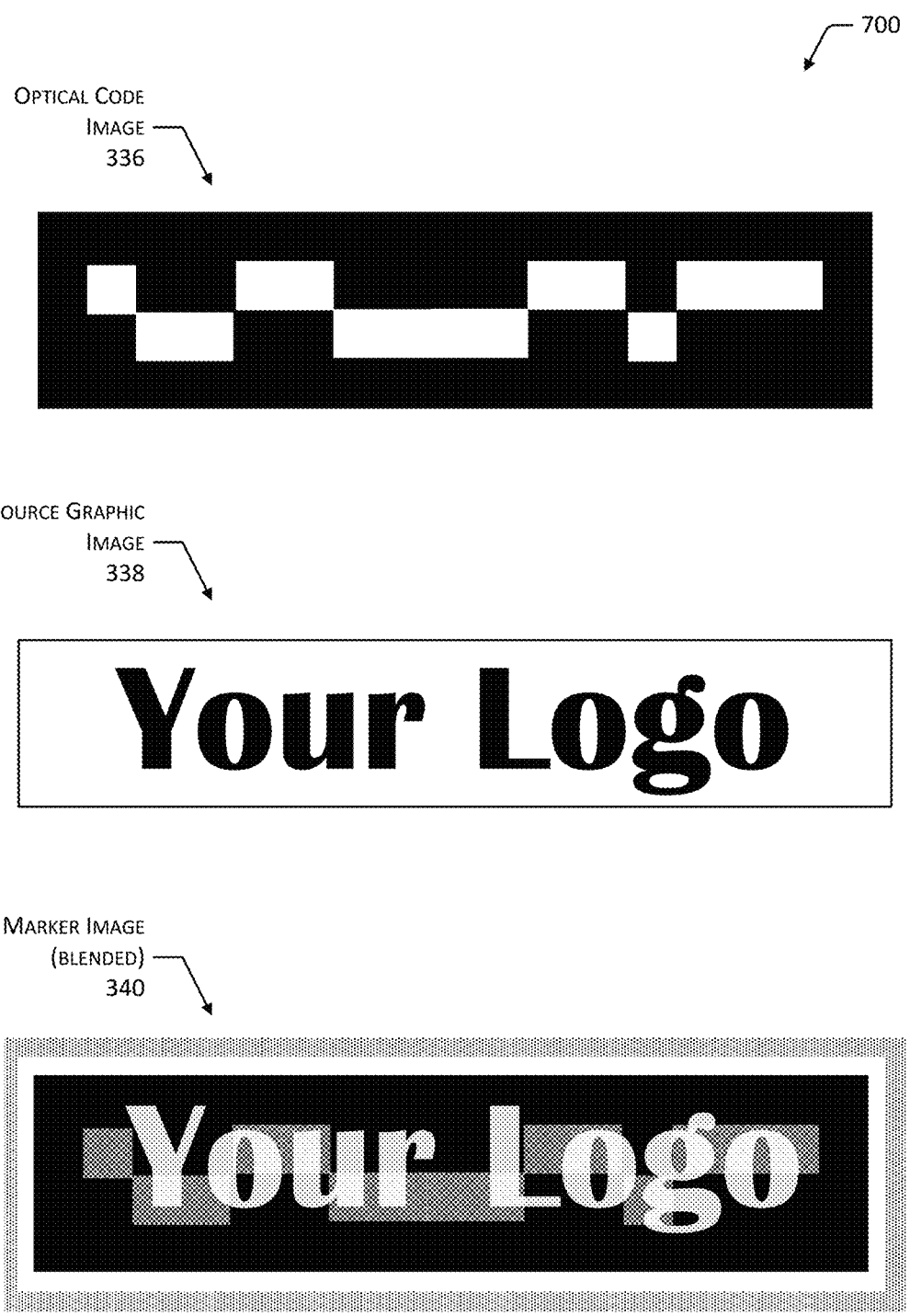
FIG. 7 illustrates blending of an optical code image and a source graphic image to form a marker image, according to some implementations.

FIG. 7 illustrates blending 700 of an optical code image 336 and a source graphic image 338 to form the marker image 340, according to some implementations. In some implementations, it may be desirable to present information in addition to the optical code image 336. For example, information such as a SKU may be presented for users 116.

The machine vision module 328 may generate the optical code image 336 including the marker data 334. For example, the OpenCV class "Blender" may be used to blend the images. The source graphic image 338 may also be accessed from the memory 316. For example, the source graphic image 338 may comprise a logo, brand name, and so forth.

As depicted here, the optical code image 336 may be blended with the source graphic image 338 to produce the marker image 340. As part of the blending process, the intensity or colors of particular portions of the source graphic image 338, the optical code image 336, or both may be modified. For example, the source graphic image 338 may use a single color of orange. In the resulting blended marker image 340, portions of the source graphic image 338 that overlay a dark graphical element 612 may be colored a dark orange. Similarly, portions of the source graphic image 338 that overlay a light graphical element 612 may be colored a light orange.

In other implementations, the blending may comprise placing the source graphic image 338 at a Z layer that is "closer" to a surface or the user during operation while the optical code image 336 is at a Z layer underneath the source graphic image 338. The opacity of the layer containing the source graphic image 338 may be decreased, allowing the optical code image 336 to show through the source graphic image 338. The opacity of the layer containing the source graphic image 338 may be configured to provide sufficient visibility of the optical code image 336 to allow for detection and processing by the machine vision module 328. For example, a minimum contract may be maintained between a graphical element 612 and a corresponding portion of the source graphic image 338 that overlays that graphical element 612.

By using this technique, additional information may be presented to the user 116 or another agency such as a robot, while maintaining readability of the marker data 334 by the machine vision module 328.

Figure 8:
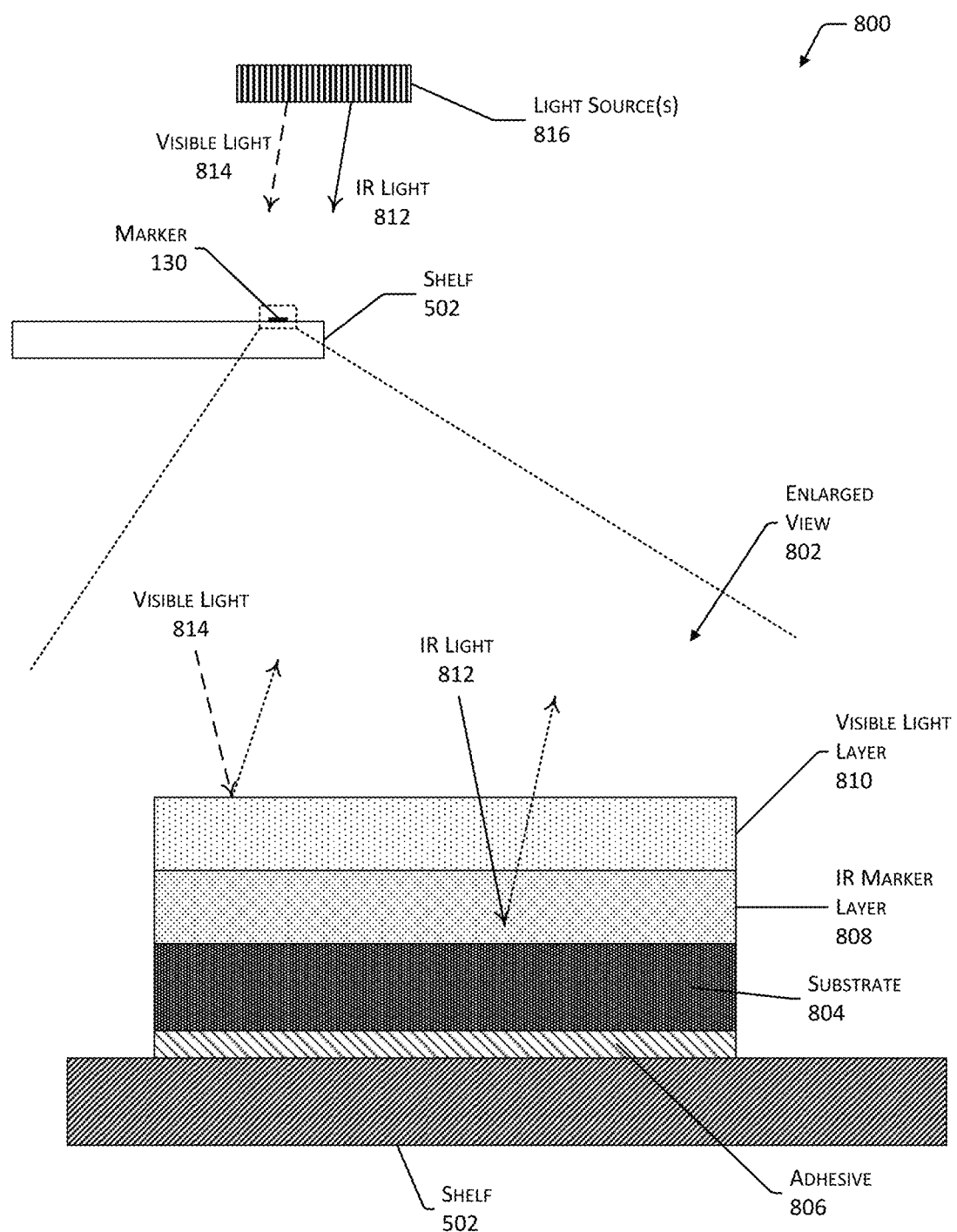
FIG. 8 illustrates components of a marker, according to some implementations.

FIG. 8 illustrates a view 800 of components of a marker 130, according to some implementations. The marker 130 may be configured to present the marker image 340 such that the optical code image 336 therein is detectable under one or more of infrared light, visible light, or ultraviolet light. The marker 130 may be printed, embossed, etched, or otherwise produced. For example, the marker 130 may be printed using a label printer on site at the facility 102, or manufactured and delivered to the facility 102. In some implementations, the marker 130 may comprise a display output device 210(3) that presents the marker image 340.

As described above, in some implementations, the imaging sensors 120(1) may be configured to generate image data 126 from infrared wavelengths. The marker 130 may be configured to present the marker image 340 in IR wavelengths while being invisible or less visible in the visible light wavelengths.

An enlarged view 802 shows a cross-section of the marker 130. A substrate 804 may be joined to a surface such as the shelf 502 by way of an adhesive 806. For example, the substrate 804 may comprise paper or plastic and the adhesive 806 may be applied to the substrate 804 during manufacture. In other implementations, the adhesive 806 may be omitted, and the marker 130 may be affixed to the shelf 502 or another object by way of mechanical retention features, clips, magnets, and so forth.

An infrared (IR) marker layer 808 is arranged atop or above the substrate 804 and is configured to present one or more graphical elements 612 such that the one or more graphical elements 612 are detectable under one or more infrared wavelengths. For example, the IR marker layer 808 may comprise a material that has been printed with IR inks or dyes. In some implementations, the IR marker layer 808 may comprise different regions of IR absorptive and IR reflective materials to produce a particular color of a particular graphical element 612. For example, the graphical elements 612 may comprise one or more of a first material reflective to infrared light or a second material absorptive of infrared light. In some implementations, the IR marker layer 808 may comprise a display output device 210(3).

A visible light layer 810 is arranged atop or above the IR marker layer 808. The visible light layer 810 may be configured to be generally transmissive to IR wavelengths and generally reflective or absorptive of visible light wavelengths. For example, the visible light layer 810 may exhibit a transmittance of greater than 50% of incident IR light 812 and is transmissive of less than 10% of incident visible light 814.

In some implementations, the visible light layer 810 may include one or more markings or other visual indicia. For example, a graphical design, words, or other visual elements may be printed or otherwise disposed on the visible light layer 810 using IR transmissive inks. The graphical design is configured to interact with and may be viewable under visible light 814, or otherwise interact with at least a portion of the incident light. The visible light layer 810 may comprise a display output device 210(3).

A light source 816 provides illumination of the marker 130. For example, the light source 816 may comprise an IR illuminator such as a vertical cavity surface emitting laser (VCSEL), LED, and so forth. One or more of the light sources 816 may be configured to emit IR light 812, visible light 814, or combination of the two.

Illustrative Processes

Figure 9:
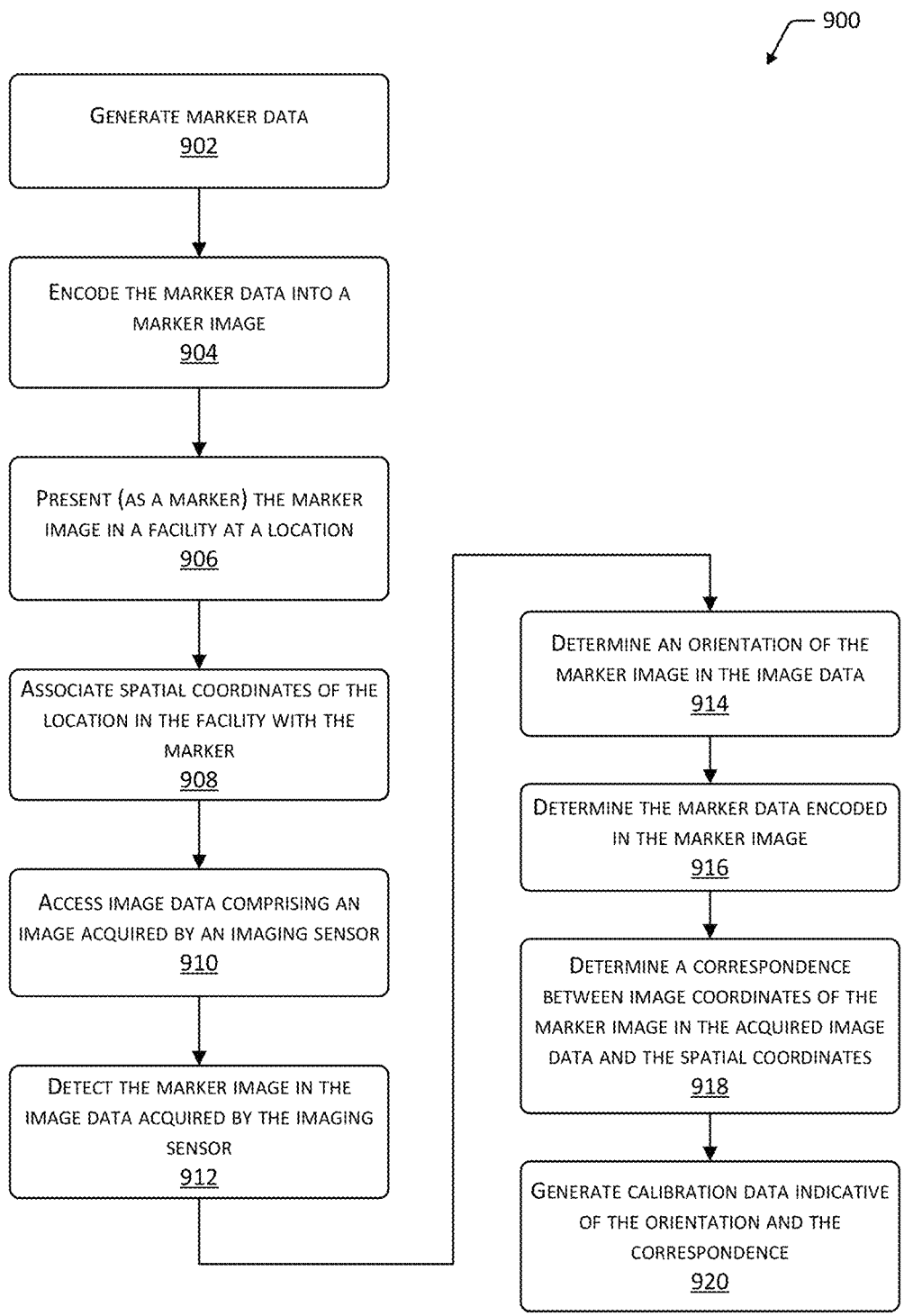
FIG. 9 depicts a flow diagram of a process of calibrating a machine vision system using a marker, according to some implementations.

FIG. 9 depicts a process 900 of calibrating a machine vision system using a marker 130, according to some implementations. In some implementations, the process may be performed at least in part by the machine vision module 328.

Block 902 generates marker data 334. For example, the marker data 334 may comprise a sequential number, spatial coordinate data 332, and so forth.

Block 904 encodes the marker data 334 into a marker image 340. For example, the marker data 334 may comprise an optical code image 336 with an array of graphical elements 612 arranged in rows r 614 and columns c 616. In some implementations, c is greater than r, producing a wide aspect ratio marker 130. The marker image 340 may include one or more of a first border 608 or a second border 610. The first border 608 or the second border 610 may extend uninterrupted around a perimeter of the two-dimensional array of graphical elements 612. In implementations where the first border 608 and the second border 610 are present, the first border 608 and the second border 610 may be adjacent to one another.

In some implementations, the marker image 340 may comprise a blend of the optical code image 336 and the source graphic image 338. For example, the marker image 340 may depict a logo overlaying or superimposed on an optical code image 336.

Block 906 presents (as a marker 130) the marker image 340 in the facility 102 at a location. For example, the marker 130 may comprise the marker image 340 printed or otherwise disposed onto a label that is affixed to an inventory location 114. In another example, the marker 130 may comprise marker image 340 as presented by a display output device 210(3).

Block 908 associates spatial coordinates of the location in the facility 102 with the marker 130. For example, the spatial coordinate data 332 corresponding to the location of the marker 130 may be provided to the inventory management module 324 for storage in the data store 320. In another example, the spatial coordinate data 332 may be determined automatically or inferred from other information, such as previously calibrated imaging sensors 120(1).

Block 910 accesses image data 126. The image data 126 comprises an image acquired by an imaging sensor 120(1) of a scene in the facility 102 within the field of view 128 of the imaging sensor 120(1). For example, the inventory management module 324 may retrieve the image data 126 from data store 320.

Block 912 detects the marker image 340 appearing in the image data 126 acquired by the imaging sensor 120(1). For example, the marker image 340 detection described above in FIG. 3 with regard to Code Implementation 1 may be used to identify the wide aspect ratio marker image 340.

Block 914 determines an orientation of the marker image 340 in the image data 126. The orientation may be indicative of one or more of rotation or tilt of the marker 130 with respect to a plane of the camera. The plane of the camera may comprise an image plane, focal plane, image sensor plane, and so forth. For example, the inventory management module 324 may determine which corner of the marker image 340 corresponds to a particular corner such as the upper left. In some implementations, the orientation may be expressed in terms of rotation in degrees or radians between a specified direction of the marker image 340 and the image data 126. For example, an orientation indicating a rotation of 0 degrees may be obtained when the imaging sensor 120(1) is facing the marker 130 squarely such that the upper left of the image expressed by the image data 126 corresponds to the upper left of the marker image 340. In some implementations, additional functions such as image deskewing may also be performed on the image data 126. In some implementations, the ArUco library may be used to determine orientation of the marker 130.

Block 916 determines the marker data 334 encoded in the marker image 340. For example, the machine vision module 328 may decode the optical code image 336 in the marker image 340 to recover the marker data 334.

Block 918 determines a correspondence between image coordinate data 342 of the marker image 340 in the acquired image data 126 and the spatial coordinate data 332. For example, the image coordinate data 342 may determine a row and column of one or more pixels in the image data 126 at which an upper left corner of the marker image 340 is depicted. The row and column may then be associated with the spatial coordinate data 332 previously stored for that upper left corner. Continuing the example, the calibration data 134 may designate the image coordinate data 342 of (67, 113) (row, column) as corresponding to the spatial coordinate data 332 indicative of distances (13.3, 21.7, 1.9) along three mutually orthogonal axes (X, Y, Z).

Block 920 generates calibration data 134. For example, the calibration data 134 may be indicative of one or more of the orientation, the correspondence, the skewing, and so forth. Once generated, the calibration data 134 may be used by the inventory management module 324 during operation. For example, the machine vision module 328 may use the calibration data 134 to determine the spatial coordinate data 332 for another object depicted in the image data 126. Once determined, the spatial coordinate data 332 may be used to provide location data in three-dimensional space within the facility, such as object tracking data.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the steps or operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a rack comprising a plurality of shelves to stow one or more items;
   a marker on an upper side of a shelf, the marker comprising a two-dimensional matrix code with a width greater than a height, and wherein an underside of the shelf is at least 165 centimeters (cm) above a floor;
   a camera within a facility;
   a memory, storing computer-executable instructions; and
   a hardware processor in communication with the camera and the memory, wherein the hardware processor is configured to execute the computer-executable instructions to:
   access image data comprising an image acquired by the camera;
   detect the marker in the image;
   determine an orientation of the marker as depicted in the image, wherein the orientation is indicative of one or more of rotation or tilt with respect to a plane of the camera;
   determine marker data encoded in the two-dimensional matrix code;
   determine a correspondence between image coordinates of the marker within the image and spatial coordinates within the facility, wherein the spatial coordinates are indicative of a known location of the marker in the facility; and
   generate calibration data indicative of the orientation and the correspondence between the image coordinates of the marker within the image and the spatial coordinates within the facility.

2. The system of claim 1, wherein the marker further comprises a source graphic blended with the two-dimensional matrix code.

3. The system of claim 1, wherein the marker is visible under infrared light, and further wherein the camera generates the image in response to the infrared light; and further comprising:
   an infrared light source to illuminate the marker with the infrared light.

4. A system comprising:
   a marker comprising:
     a substrate;
     an array of graphical elements arranged in rows and columns on the substrate, wherein a number of columns is greater than a number of rows, and wherein color and placement in the array of the graphical elements encodes marker data;
     a first border with a first color on the substrate, the first border extending uninterrupted around a perimeter of the array;
     a visible light layer arranged over the array, wherein the visible light layer is transmissive of at least 50% of incident infrared light and less than 10% of incident visible light; and
     wherein the graphical elements interact with at least a portion of the incident infrared light.

5. The system of claim 4, further comprising a graphical design disposed on the visible light layer, wherein the graphical design interacts with at least a portion of the incident visible light.

6. The system of claim 4, the marker further comprising a second border with a second color, the second border adjacent to and extending around a perimeter of the first border, wherein the first color and the second color are different from each other.

7. The system of claim 4, wherein each of the graphical elements in the array comprises a square having a height and a width within less than 10% of one another.

8. The system of claim 4, the marker further comprising a source graphic image blended with at least a portion of the graphical elements in the array.

9. The system of claim 4, wherein a height of the marker is between 2 cm and 4 cm and the first border is uninterrupted.

10. The system of claim 4, further comprising a rack and wherein the marker is mounted to the rack at a height of at least 165 centimeters above a floor.

11. The system of claim 4, further comprising a flooring system and wherein the marker is one or more of mounted on or embedded within the flooring system.

12. The system of claim 4, wherein the graphical elements comprise one or more of a first material reflective to at least a portion of infrared light or a second material absorptive of at least a portion of the infrared light.

13. The system of claim 4, further comprising:
    a camera;
    a memory, storing computer-executable instructions; and
    a hardware processor in communication with the camera and the memory, wherein the hardware processor is configured to execute the computer-executable instructions to:
      access image data comprising an image acquired by the camera;
      detect an image of the marker in the image;
      determine the marker data encoded in the array of graphical elements;
      determine a correspondence between coordinates of the marker within the image and coordinates in space; and
      generate calibration data indicative of the correspondence between the coordinates of the marker within the image and the coordinates in space.

14. The system of claim 4, wherein the graphical elements interact with the at least a portion of the incident infrared light by one or more of reflection, absorption, fluorescence, or diffraction.

15. A system comprising:
    a marker comprising:
      an array of graphical elements using color and placement, the color and the placement each being used for separately encoding marker data, the array of graphical elements being arranged in rows and columns on a substrate, wherein a number of columns is greater than a number of rows;
      a source graphic image blended with at least a portion of the graphical elements in the array; and
      a first border extending uninterrupted around a perimeter of the array of graphical elements.

16. The system of claim 15, the marker further comprising:
    a visible light layer arranged over the array of graphical elements;
    wherein the visible light layer is transmissive of at least 50% of incident infrared light and less than 10% of incident visible light; and
    wherein the graphical elements interact with at least a portion of the incident infrared light.

17. The system of claim 16, further comprising a graphical design disposed on the visible light layer, wherein the graphical design interacts with at least a portion of the incident visible light.

18. The system of claim 15, wherein the graphical elements comprise one or more of a first material reflective to at least a portion of infrared light or a second material absorptive of at least a portion of the infrared light.

19. The system of claim 15, further comprising:
a memory, storing computer-executable instructions; and
a hardware processor in communication with the memory, wherein the hardware processor executes the computer-executable instructions to:
access image data comprising an image acquired by an imaging sensor;
detect an image of the marker in the image;
determine the marker data encoded in the array of graphical elements;
determine a correspondence between coordinates of the marker within the image and coordinates in space; and
generate calibration data indicative of the correspondence between the coordinates of the marker within the image and the coordinates in space.

20. The system of claim 15, wherein the first border is a first color and the marker further comprising a second border with a second color, the second border adjacent to and extending around a perimeter of the first border, wherein the first color and the second color are different from each other.

21. A system comprising:
a marker on a shelf, the marker comprising a two-dimensional matrix code;
a camera within a facility;
a memory, storing computer-executable instructions; and
a hardware processor in communication with the camera and the memory, wherein the hardware processor is configured to execute the computer-executable instructions to:
generate calibration data for the camera, wherein the calibration data is generated using image data obtained by the camera which depicts the marker and marker data encoded in the two-dimensional matrix code; and
identify an object in the facility using the camera, after calibration of the camera has been performed.

* * * * *